United States Patent
Muehlmann et al.

(10) Patent No.: US 10,630,514 B2
(45) Date of Patent: Apr. 21, 2020

(54) BIT SYNCHRONIZATION FOR ON/OFF KEY (OOK) COMMUNICATION

(71) Applicant: NXP B.V., Eindhoven (NL)

(72) Inventors: Ulrich Andreas Muehlmann, Graz (AT); Stefan Mendel, Graz (AT); Steve Charpentier, Antibes (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/364,320

(22) Filed: Mar. 26, 2019

(65) Prior Publication Data

US 2019/0327119 A1   Oct. 24, 2019

(30) Foreign Application Priority Data

Apr. 24, 2018 (EP) .................................... 18305508

(51) Int. Cl.
  *H04L 27/06* (2006.01)
  *H04B 1/10* (2006.01)
  *H04L 7/027* (2006.01)
  *H04L 25/03* (2006.01)

(52) U.S. Cl.
  CPC ......... *H04L 27/066* (2013.01); *H04B 1/1027* (2013.01); *H04L 7/027* (2013.01); *H04L 25/03159* (2013.01)

(58) Field of Classification Search
  CPC ............. H04L 25/03866; H04L 27/066; H04L 25/4902; H04L 25/03159; H04L 27/02; H04L 27/2042; H04L 27/2278; H04L 7/027; H04B 1/1027
  See application file for complete search history.

(56) References Cited

U.S. PATENT DOCUMENTS

| | | | |
|---|---|---|---|
| 3,626,298 A | 12/1971 | Anderson et al. | |
| 3,794,978 A * | 2/1974 | Staron | G01V 1/223 375/367 |
| 5,757,857 A | 5/1998 | Buchwald | |
| 9,146,804 B2 * | 9/2015 | Park | G06F 11/08 |
| 2003/0165184 A1 * | 9/2003 | Welborn | H04B 1/7176 375/146 |
| 2004/0120424 A1 * | 6/2004 | Roberts | H04B 1/7163 375/327 |
| 2004/0142663 A1 * | 7/2004 | Roberts | H04B 1/7172 455/73 |
| 2010/0060432 A1 | 3/2010 | van Niekerk et al. | |
| 2014/0314193 A1 | 10/2014 | Sung | |

FOREIGN PATENT DOCUMENTS

| | | |
|---|---|---|
| CA | 725268 A | 1/1966 |
| KR | 2014/0124604 | 10/2014 |

* cited by examiner

*Primary Examiner* — Khanh C Tran

(57) ABSTRACT

Methods and system for On/Off Key (OOK) communication are described. In one embodiment, a method for OOK communication involves detecting an average symbol energy of an OOK modulated sequence and performing bit synchronization for the OOK modulated sequence in response to the detected average symbol energy. Other embodiments are also described.

10 Claims, 9 Drawing Sheets

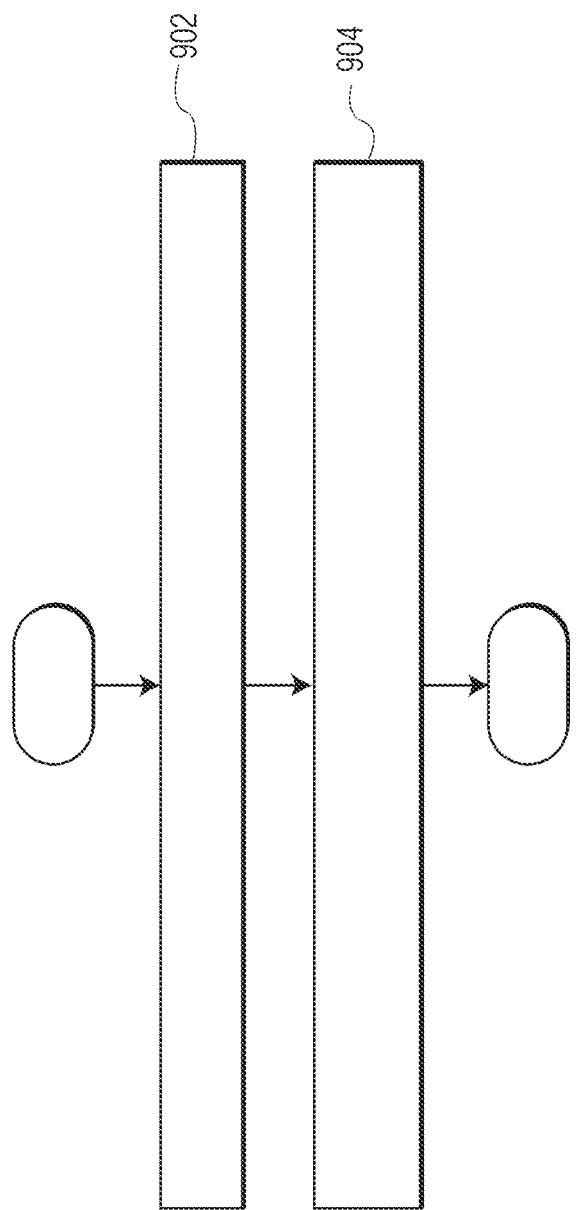

BIT SYNCHRONIZATION FOR ON/OFF KEY (OOK) COMMUNICATION

CROSS-REFERENCE TO RELATED APPLICATIONS

This application claims priority under 35 U.S.C. § 119 to European Patent Application No. 18305508.6, filed on Apr. 24, 2018, the contents of which are incorporated by reference herein.

BACKGROUND

Embodiments of the invention relate generally to communications methods and systems and, more particularly, to methods and systems for On/Off Key (OOK) communication.

In OOK modulation, digital data is represented by the presence or absence of a carrier signal. Specifically, a logic 1 is represented by the presence of a carrier signal and a logic 0 is represented by the absence of the carrier signal. Bit synchronization of an OOK modulated sequence can affect the quality of the OOK reception/demodulation, especially under low signal-to-noise (SNR) and high inter-symbol-interference (ISI) conditions. For example, incorrect or sub-optimal bit synchronization can result in setting an incorrect or sub-optimal amplitude threshold for detecting the presence of a carrier signal, which can lead to incorrect demodulation results.

SUMMARY

Methods and system for OOK communication are described. In one embodiment, a method for OOK communication involves detecting an average symbol energy of an OOK modulated sequence and performing bit synchronization for the OOK modulated sequence in response to the detected average symbol energy. Other embodiments are also described.

In one or more embodiments, detecting the average symbol energy of the OOK modulated sequence involves removing a parasitic direct current (DC) component of the OOK modulated sequence to generate an output sequence.

In one or more embodiments, removing the parasitic direct current (DC) component of the OOK modulated sequence involves correlating a filter template with the OOK modulated sequence to detect a presence of the filter template in the OOK modulated sequence using a square wave subcarrier matched filter unit.

In one or more embodiments, detecting the average symbol energy of the OOK modulated sequence further involves removing a sideband section from the output sequence or removing a signal section having an amplitude value that is below a threshold from the output sequence to generate a rectified output sequence.

In one or more embodiments, detecting the average symbol energy of the OOK modulated sequence further involves correlating a filter template with the rectified output sequence to detect a presence of the filter template in the rectified output sequence using a moving average low pass filter unit.

In one or more embodiments, an OOK communication device includes a matched filter configured to detect an average symbol energy of an OOK modulated sequence and a bit synchronization matched filter configured to perform bit synchronization for the OOK modulated sequence in response to the detected average symbol energy.

In one or more embodiments, the matched filter includes a square wave subcarrier matched filter unit configured to remove a parasitic direct current (DC) component of the OOK modulated sequence to generate an output sequence.

In one or more embodiments, the square wave subcarrier matched filter unit is configured to correlate a filter template with the OOK modulated sequence to detect a presence of the filter template in the OOK modulated sequence.

In one or more embodiments, the matched filter further includes a signal rectification unit configured to remove a sideband section from the output sequence or remove a signal section having an amplitude value that is below a threshold from the output sequence to generate a rectified output sequence.

In one or more embodiments, the matched filter further includes a moving average low pass filter unit configured to correlate a filter template with the rectified output sequence to detect a presence of the filter template in the rectified output sequence.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

FIG. 9 is a process flow diagram of a method for OOK communication in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
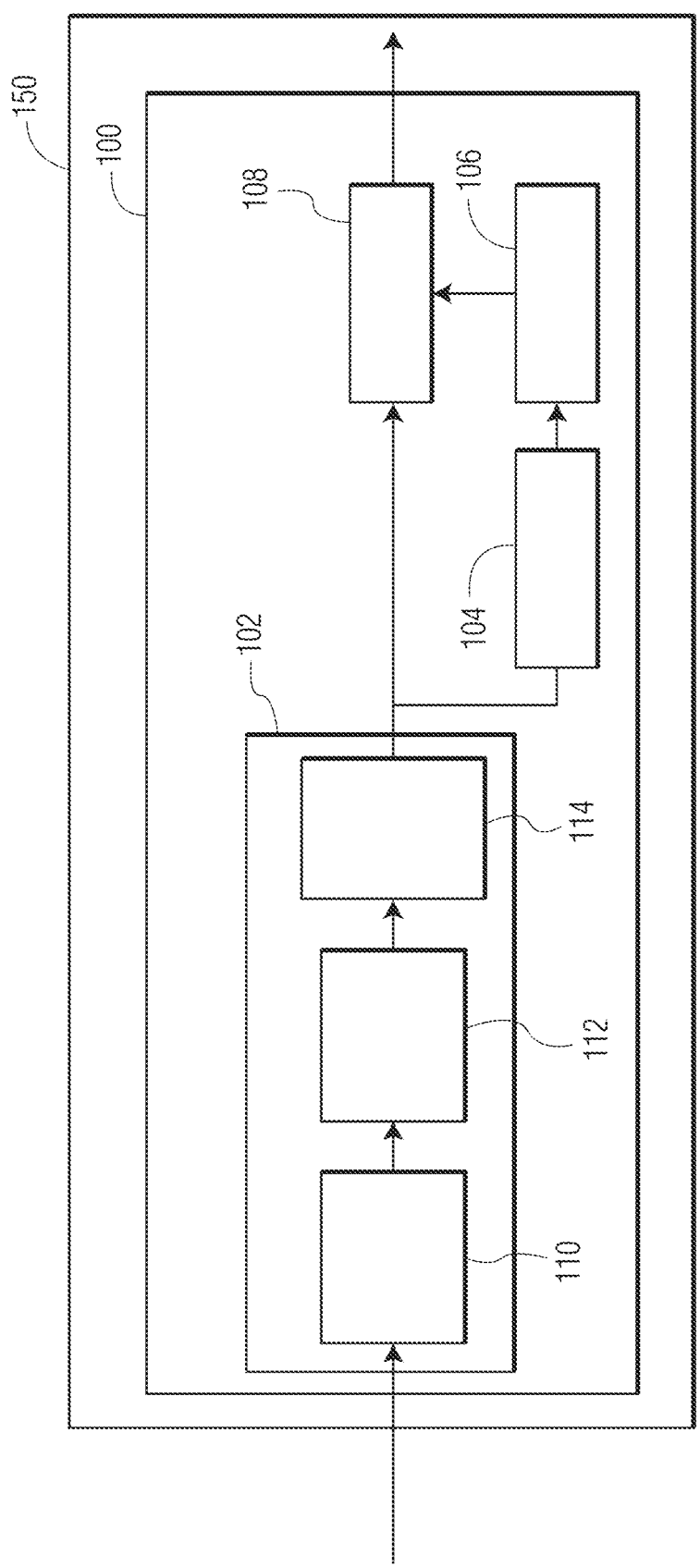
FIG. 1 is a schematic block diagram of a bit synchronizer in accordance with an embodiment of the invention.

FIG. 1 is a schematic block diagram of a bit synchronizer 100 in accordance with an embodiment of the invention. The bit synchronizer can be used in various communication devices. In the embodiment depicted in FIG. 1, the bit synchronizer is a component of an OOK communication device 150, for example, an OOK demodulator. In some embodiments, the OOK communication device is a smart card device or a smart card reader device, which can be compatible with International Organization for Standardization (ISO) 14443 Type A106k standard, ISO 15693 ICODE standard, and ISO 18000 3M3 Radio-frequency identification (RFID) standard.

In the embodiment depicted in FIG. 1, the bit synchronizer 100 includes a matched filter (MF) 102, a synchronization matched filter (SYNC-MF) 104, a bit-grid determiner 106, and a bit slicer 108. The various components of the bit synchronizer may be implemented in hardware (e.g., digital logics or analog circuits), software that is stored in a non-transitory computer readable medium or a combination of hardware and software that is stored in a non-transitory computer readable medium. Although the bit synchronizer is shown in FIG. 1 as being including certain components, in some embodiments, the bit synchronizer includes more or less components to implement more or less functionalities.

Some bit synchronizer implementations rely on the detection of the first bits/symbol or sequence of bits/symbols to define a bit boundary/grid. In these bit synchronizer implementations, an incorrect or sub-optimal bit-grid decision impairs the quality of the signal reception/demodulation. However, defining the bit boundary/grid based on the detection of the first bits/symbol or sequence of bits/symbols limits the processing gain to the duration of one subcarrier period, which is sub-optimal in relation to the actual data-rate that is normally a fraction of the subcarrier period. In addition, using precise ratios between the data rate and the subcarrier period for decoding is also error prone because inter-symbol-interference (ISI) (normally visible as parasitic DC during OOK modulation) may false trigger the subcarrier detection threshold and may distort the synchronization instant. Compared to bit synchronizer implementations that define the bit boundary/grid based on the detection of the first bits/symbol or sequence of bits/symbols, the bit synchronizer 100 depicted in FIG. 1 can detect a bit boundary/grid of an OOK modulated sequence by detect an average symbol energy of an OOK modulated sequence and performing bit synchronization for the OOK modulated sequence in response to the average symbol energy. Consequently, the bit synchronizer 100 depicted in FIG. 1 can achieve high synchronization probability under low signal-to-noise (SNR) and high ISI condition.

The matched filter 102 of the bit synchronizer 100 is configured to detect an average symbol energy of an OOK modulated sequence. The matched filter may be located on a signal path after an analog-to-digital converter (ADC) (not shown in FIG. 1), which can be connected to an antenna or a wired communication interface. In some embodiments, the matched filter is configured to correlate a known signal or template with a received OOK modulated signal to detect the presence of the template in the received OOK modulated signal. The matched filter can be used to improve the signal-to-noise ratio (SNR) in the presence of additive stochastic noise.

In the embodiment depicted in FIG. 1, the matched filter 102 includes a square wave subcarrier matched filter (SWSCMF) unit 110, a signal rectification unit 112, and a moving average low pass filter (MALP) unit 114. The SWSCMF unit is configured to remove a parasitic direct current (DC) component of an OOK modulated sequence. The SWSCMF unit may be configured to correlate a filter template with a received OOK modulated sequence to detect the presence of the filter template in the received OOK modulated sequence. The signal rectification unit is configured to remove a signal section from an output of the SWSCMF unit. In some embodiments, the signal rectification unit is configured to remove a sideband section from the output sequence and/or remove a signal section having an amplitude value that is below a threshold from the output sequence to generate a rectified output sequence. For example, the signal rectification unit may remove a sideband section from an output of the SWSCMF unit and/or to provide an absolute value section of the output of the SWSCMF unit to the MALP unit. The MALP unit is configured to detect an average symbol energy of the OOK modulated sequence based on the output of the SWSCMF unit. In an embodiment, the MALP unit is configured to correlate a filter template with the rectified output sequence from the signal rectification unit to detect a presence of the filter template in the rectified output sequence. The average symbol energy of the OOK modulated sequence features a centric peak, which is also referred to as correlation maximum. The centric peak can be used to define the synchronization instant for the synchronization matched filter 104.

Figure 2:
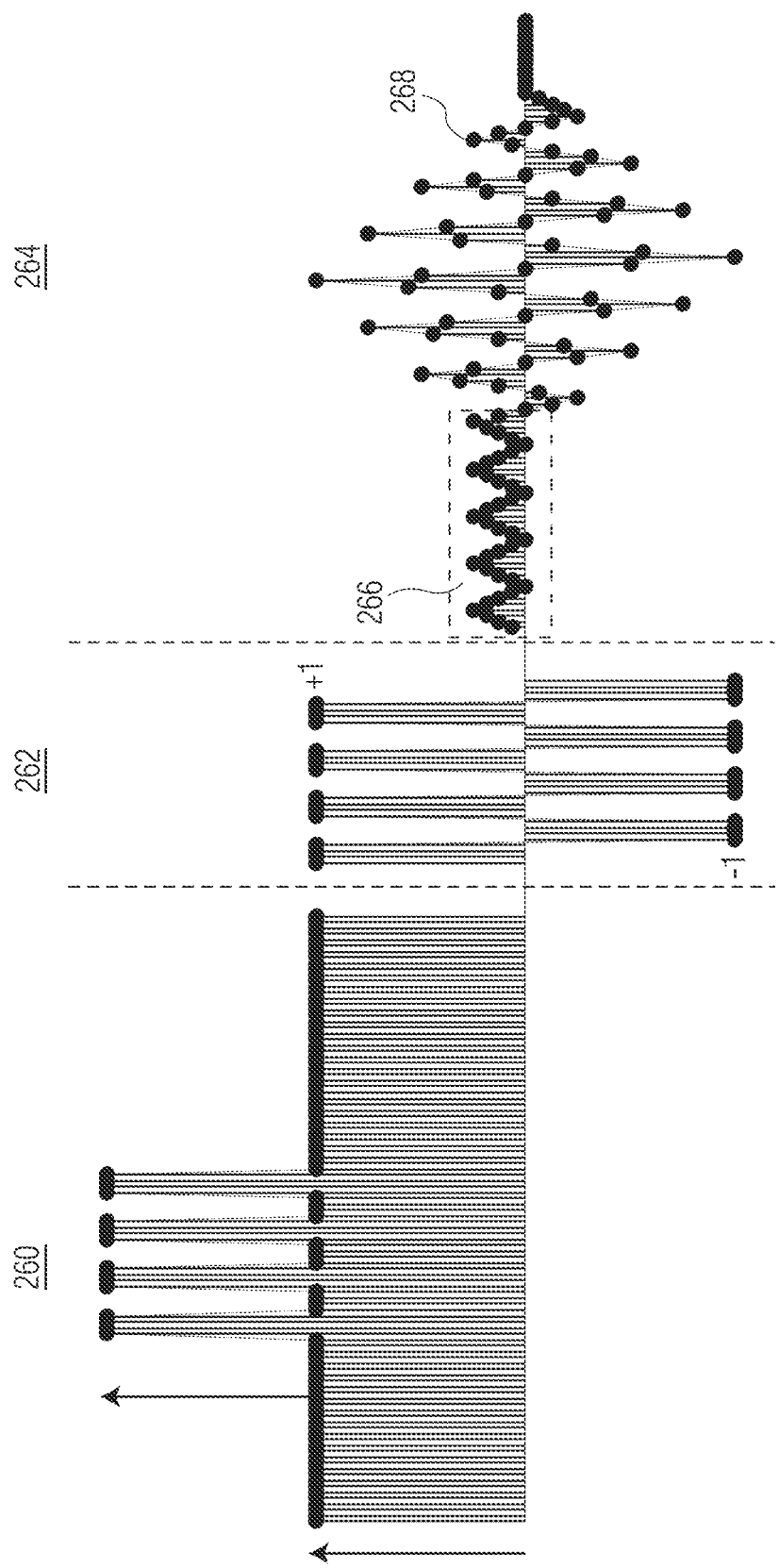
FIGS. 2 and 3 illustrate an example of the operations of a matched filter (MF) of the bit synchronizer depicted in FIG. 1.
Figure 3:
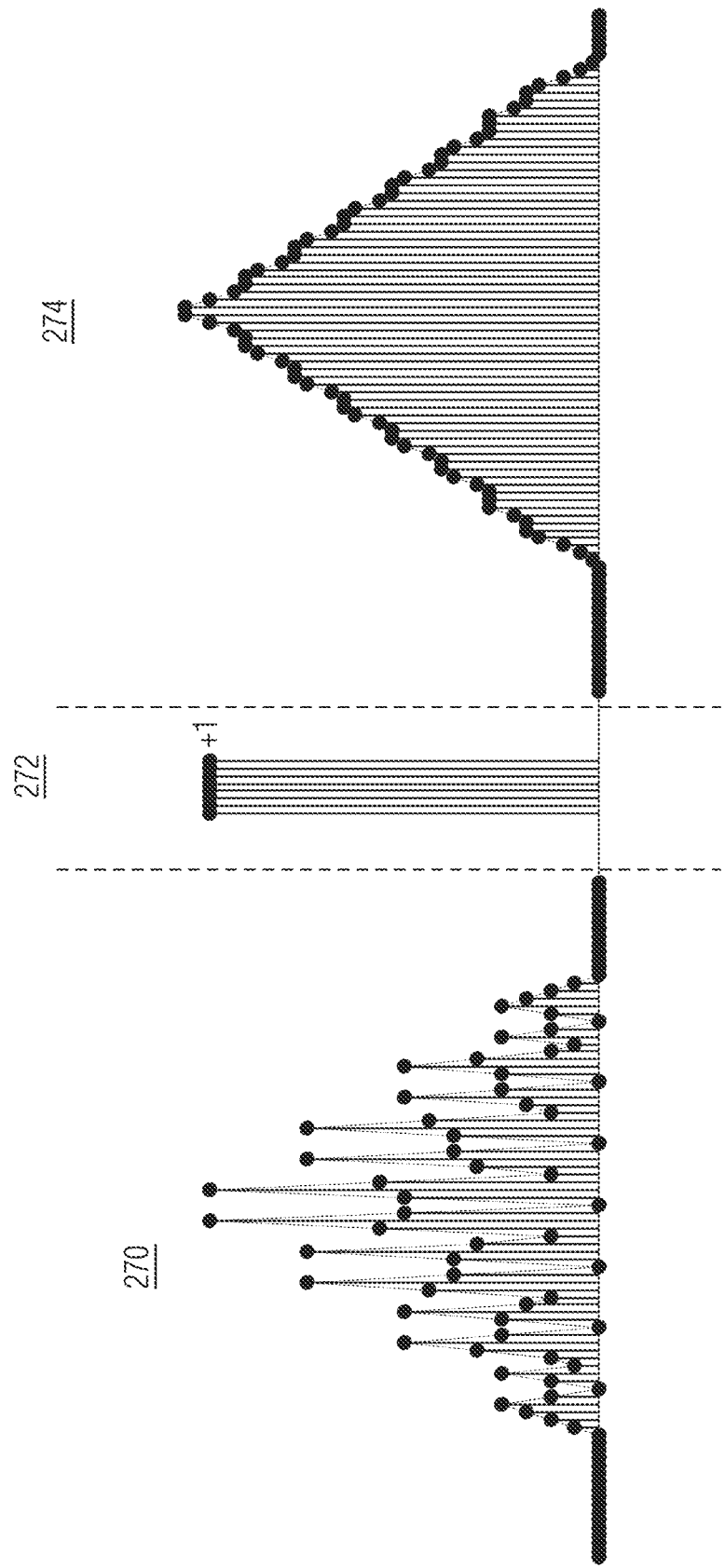

FIGS. 2 and 3 illustrate an example of the operations of the SWSCMF unit 110, the signal rectification unit 112, and the MALP unit 114 of the matched filter 102 of the bit synchronizer 100 depicted in FIG. 1. Specifically, FIG. 2 illustrates an input OOK modulated sequence 260 of the match filter, a filter template 262 of the SWSCMF unit, and an output 264 of the SWSCMF unit. As illustrated in FIG. 2, the input OOK modulated sequence of the SWSCMF unit has parasitic DC components (indicated by the unlabeled lower left arrow), and Signal LMA components (indicated by the unlabeled upper left arrow). The filter template of the SWSCMF unit has a similar pattern as the input OOK modulated sequence. By correlating the filter template with the input OOK modulated sequence, an output of the SWSCMF unit that does not have the parasitic DC components is generated. As illustrated in FIG. 2, the output of the SWSCMF unit includes a filter initial setting (e.g., a side band section) 266 and a signal section 268.

FIG. 3 illustrates an input sequence (e.g. with filter initial setting removed and ABS values of the signal section) 270 of the MALP unit 114, a filter template 272 of the MALP unit, and an output 274 of the MALP unit. As illustrated in FIG. 3, the input sequence of the MALP unit is generated by removing the filter initial setting of the output of the SWSCMF unit 110 (shown in FIG. 2) using the signal rectification unit 112 and by obtaining absolute values of the remaining signal section of the output of the SWSCMF unit using the signal rectification unit. The filter template of the MALP unit has a similar pattern as the filter template of the SWSCMF unit. By correlating the filter template of the MALP unit with the input sequence of the MALP unit, an average symbol energy of an OOK modulated sequence, which may be gain compensated, is generated.

Turning back to FIG. 1, the SYNC-MF 104 of the bit synchronizer 100 is configured to perform bit synchronization for the OOK modulated sequence received at the bit synchronizer in response to the detected average symbol energy. In some embodiments, the SYNC-MF is configured to correlate a known signal or template with an output from the matched filter 102. In an embodiment, the bit synchronization matched filter is further configured to determine synchronization instant from a first order derivation of the average symbol energy. The SYNC-MF can incorporate a full equivalent time unit (ETU) of the data-rate being used, which is a multiple of the carrier frequency (base time reference).

Figure 4:
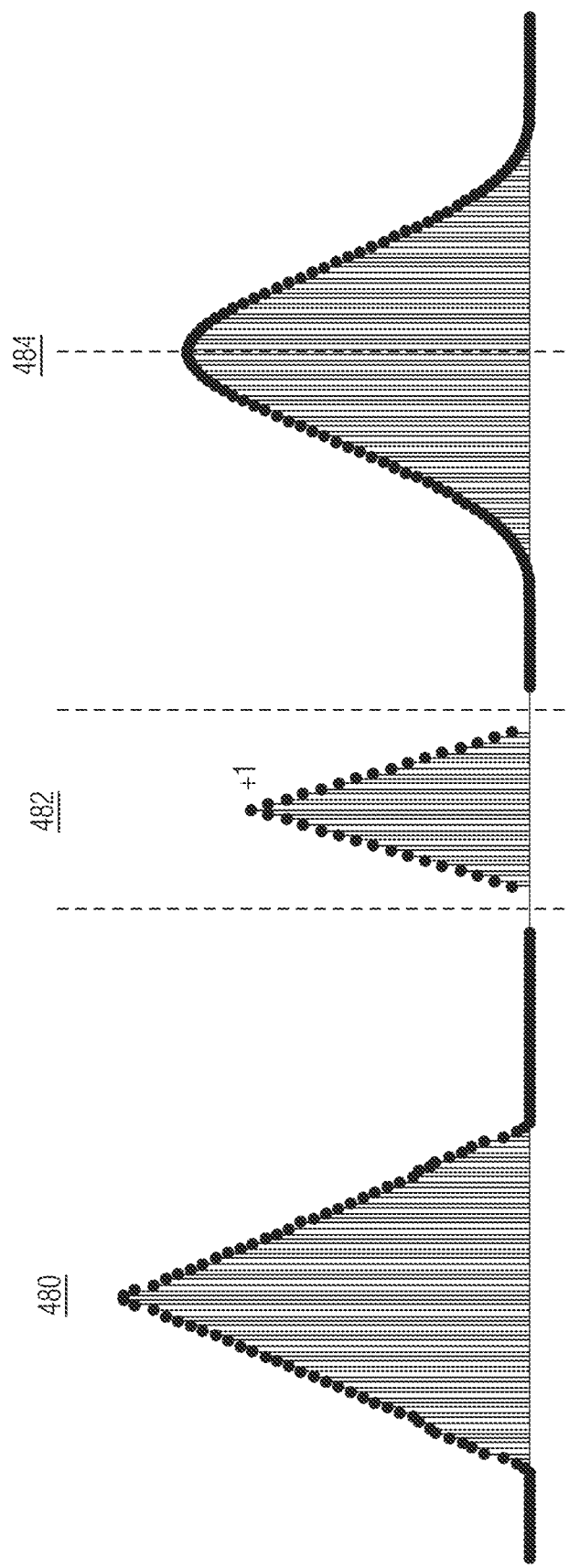
FIGS. 4 and 5 illustrate an example of the operations of a synchronization matched filter (SYNC-MF) of the bit synchronizer depicted in FIG. 1.
Figure 5:
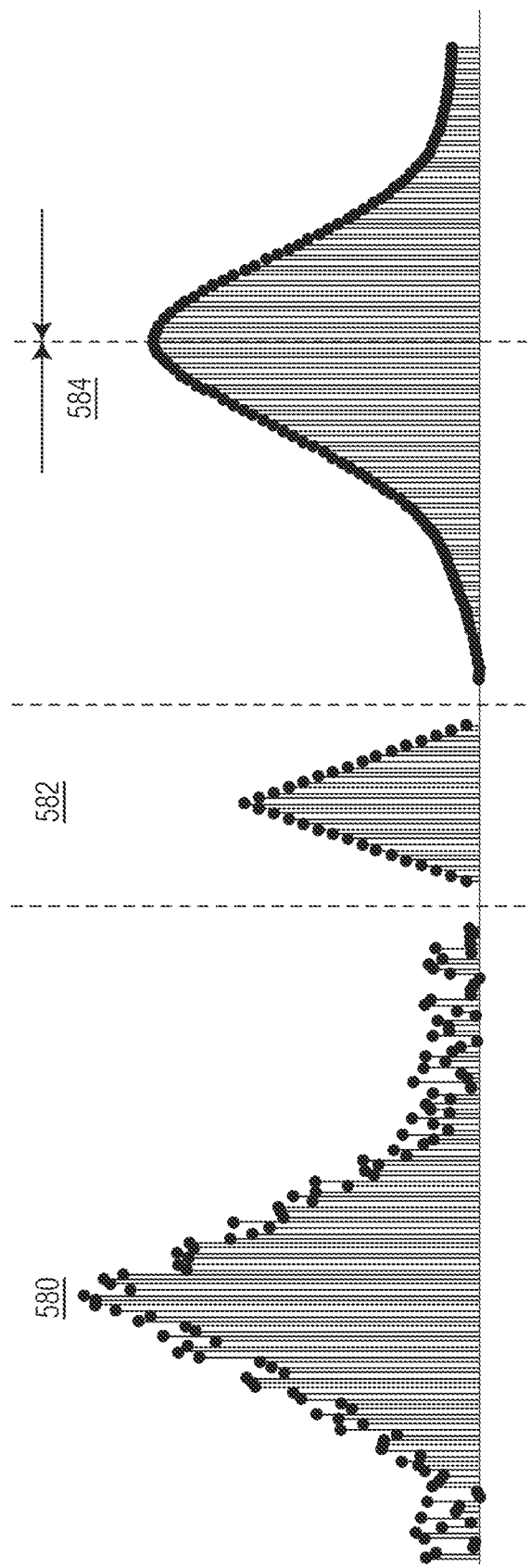

FIGS. 4 and 5 illustrate an example of the operations of the SYNC-MF 104 depicted in FIG. 1. Specifically, FIG. 4 illustrates an output sequence 480 of the MALP unit 114, a filter template 482 of the SYNC-MF, and an output 484 of the SYNC-MF under high SNR. As illustrated in FIG. 4, the filter template 482 of the SYNC-MF has a similar pattern as the output sequence 480 of the MALP unit. By correlating the filter template 482 of the SYNC-MF with the output sequence 480 of the MALP unit, the output 484, which is a replica of the average signal energy pattern over time is generated. FIG. 5 illustrates an output sequence 580 of the MALP unit, a filter template 582 of the SYNC-MF, and an output 584 of the SYNC-MF under low SNR. As illustrated in FIG. 5, the filter template 582 of the SYNC-MF has a similar pattern as the output sequence 580 of the MALP unit. By correlating the filter template 582 of the SYNC-MF with the output sequence 580 of the MALP unit, the output 584, which is a replica of the average signal energy pattern over time is generated. The synchronization instant of the SYNC-MF is not affected by the noise and additional parasitic DC components under low SNR. The SYNC-MF can provide massive processing gain and hence provide superior performance under low SNR conditions.

Figure 6:
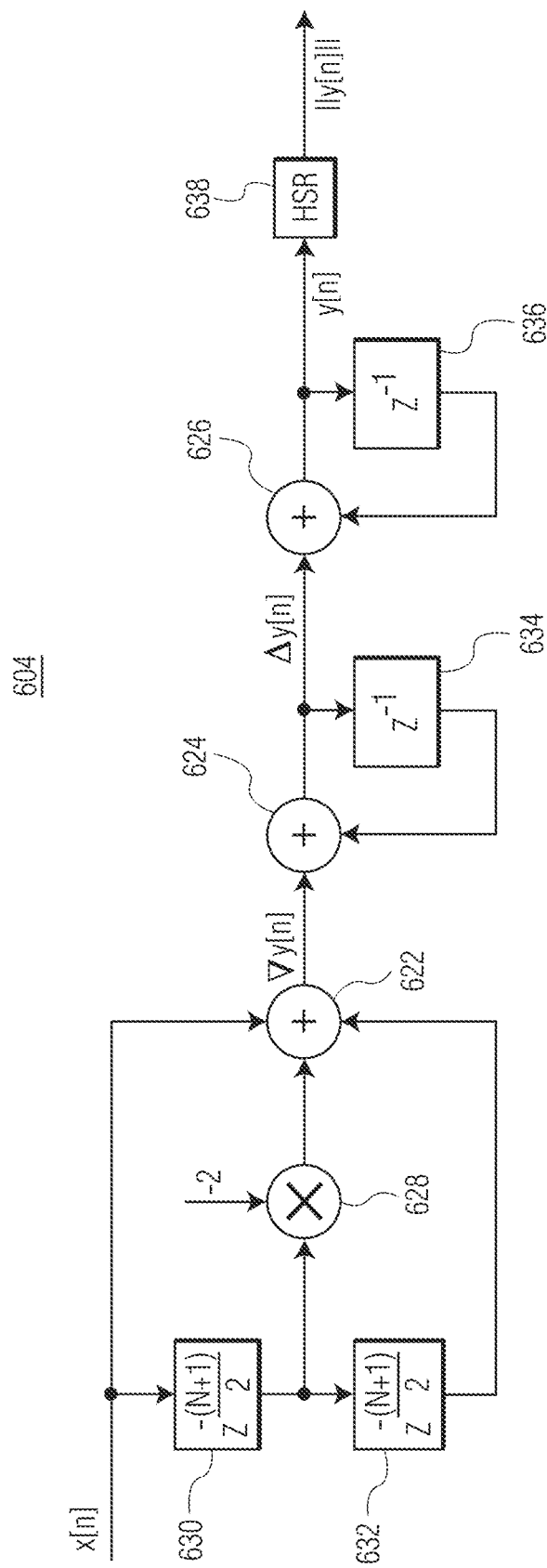
FIG. 6 depicts an embodiment of the SYNC-MF of the bit synchronizer depicted in FIG. 1.

FIG. 6 depicts an embodiment of the SYNC-MF 104 depicted in FIG. 1. In the embodiment depicted in FIG. 6, a SYNC-MF 604 includes adders 622, 624, 626, a multiplier 628, delay elements 630, 632, 634, 636, and a hardware shifter (HSR) 638. The delay elements 630, 632 are delay elements having a delay of (N+1)/2 samples, where N is an odd integer. The delay elements 634, 636 are delay elements having a delay of 1 sample. The HSR is configured to perform a right shift operation, which is equivalent to division by 2. The SYNC-MF 604 depicted in FIG. 6 is a possible implementation of the SYNC-MF 104 depicted in FIG. 1. However, the SYNC-MF 104 depicted in FIG. 1 can be implemented differently from the SYNC-MF 604 depicted in FIG. 6. The invention is not restricted to the particular implementation of the SYNC-MF 104 depicted in FIG. 6.

In some embodiments, an input sequence, x[n] (n being a position integer), is input into the delay element 630 and to the adder 622, an output sequence, $\nabla y[n]$, is generated by the adder 622, an output sequence, $\Delta y[n]$, is generated by the adder 624, an output sequence, y[n], is generated by the adder 626, and an output sequence, $\|y[n]\|$, is generated by the HSR 638. In an embodiment, the SYNC-MF 604 is a finite impulse response (FIR) that has a filter template having a triangular shape, such as, [1, 2, 3, . . . , N, N−1, . . . , 3, 2, 1]. The impulse response of the SYNC-MF can be expressed as:

$$H_{MF}(z) = \sum_{i=0}^{N-1} b_i z^{-i}, \quad (1)$$

where $b_i$ defines the i-th coefficient of the impulse response of the SYNC-MF. For simplicity, a 9-tap isosceles triangular shaped impulse response for the SYNC-MF is considered. First, the primary transfer function of equation (1) can be extended to:

y[n−1]=x[n−1]+2x[n−2]+3x[n−3]+4x[n−4]+5x[n−5] . . . +4x[n−6]+3x[n−7]+2x[n−8]+x[n−9], y[n]=x[n]+2x[n−1]+3x[n−2]+4x[n−3]+5x[n−4] . . . +4x[n−5]+3x[n−6]+2x[n−7]+x[n−8], $\Delta y=y[n]-y[n-1]$ $y[n]=y[n-1]+\Delta y.$ (2)

From the extended transfer function of equation (2), the intermediate iterative filter output can be derived as:

y[n]=y[n−1]+x[n]+x[n−1]+x[n−2]+x[n−3]+x[n−4] . . . −x[n−5]−x[n−6]−x[n−7]−x[n−8]−x[n−9] (3)

By performing an additional derivation of equation (2), it can be derived as:

$\Delta y[n]$=x[n]+x[n−1]+x[n−2]+x[n−3]+x[n−4] . . . −x[n−5]−x[n−6]−x[n−7]−x[n−8]−x[n−9]

$\Delta y[n-1]$=x[n−1]+x[n−2]+x[n−3]+x[n−4]+x[n−5] . . . −x[n−6]−x[n−7]−x[n−8]−x[n−9]−x[n−10]

$\nabla y=\Delta y[n]-\Delta y[n-1]$ $y[n]=y[n-1]+\Delta y[n-1]+\nabla y,$ (4)

It can be further derived as:

$\nabla y=x[n]-2x[n-5]+x[n-10]$ $\Delta y[n]=\Delta y[n-1]+\nabla y$ $y[n]=y[n-1]+\Delta y[n].$ (5)

The synchronization instant is determined by first order derivation of the output of the SYNC-MF. First order derivation transfer function can be expressed by:

$H_{ZC}(z)=1-z^{-1}$ (6)

Turning back to FIG. 1, the bit-grid determiner 106 of the bit synchronizer 100 is configured to determine a bit boundary for the OOK modulated sequence received at the bit synchronizer based on an output from the SYNC-MF 104. In some embodiments, the bit-grid determiner determines the bit boundary for the OOK modulated sequence received at the bit synchronizer based on zero-crossing of the first order derivation of the output of the SYNC-MF 104. The bit-grid determiner can be implemented with one or more digital logic circuits.

Figure 7:
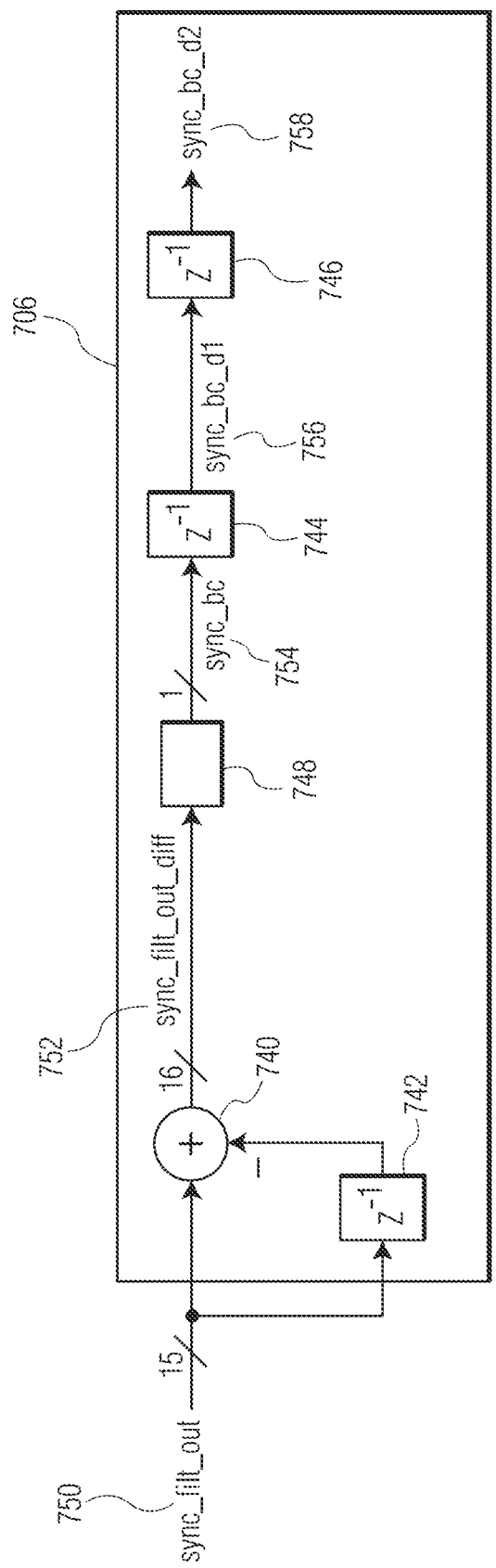
FIG. 7 depicts an embodiment of a bit-grid determiner of the bit synchronizer depicted in FIG. 1.

FIG. 7 depicts an embodiment of the bit-grid determiner 106 of the bit synchronizer 100 depicted in FIG. 1. In the embodiment depicted in FIG. 7, a bit-grid determiner 706 includes an adder 740, delay elements 742, 744, 746, and a sign logic 748. The delay elements 742, 744, 746 are delay elements having a delay of 1 sample. The sign logic is configured to perform a sign related operation. The bit-grid determiner 706 depicted in FIG. 7 is a possible implementation of the bit-grid determiner 106 depicted in FIG. 1. However, the bit-grid determiner 106 depicted in FIG. 1 can be implemented differently from the bit-grid determiner 706 depicted in FIG. 7. The invention is not restricted to the particular implementation of the bit-grid determiner 706 depicted in FIG. 7.

In an operation of the bit-grid determiner 706, the output signal (sync_filt_out) 750 of the SYNC-MF 104 is input into the delay element 742 and the adder 740. The instance when the output signal (sync_filt_out) 750 changes from positive slope to negative slope or vice-versa is used to establish the synchronization instant. An output signal (sync_filt_out_diff) 752 of the adder is input into the sign logic 748, which perform a sign related operation on the signal 752 to generate an output signal (sync_be) 754. In an embodiment, if the output signal (sync_filt_out_diff) 752 is greater than or equal to zero, the corresponding output signal (sync_be) 754 is set to logic 1 and if the output signal (sync_filt_out_diff) 752 is lower/smaller than zero, the corresponding output signal (sync_be) 754 is set to logic 0. The delay element 744 delays the signal 754 to generate a delayed signal (sync_be_d1) 756. The delay element 746 delays the delayed signal 756 to generate an output delayed signal (sync_be_d2) 758. The signals 756, 758 can be used for start of frame (SOF) detection.

Figure 8:
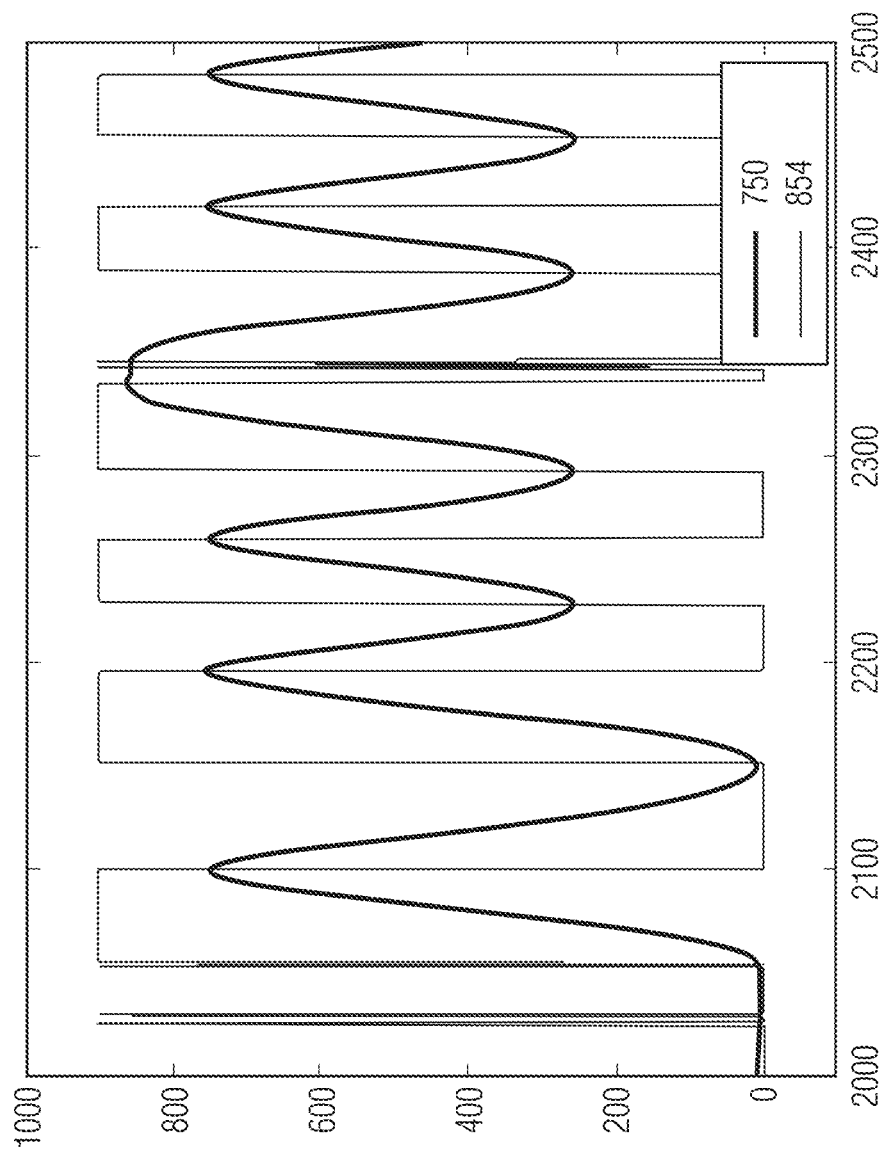
FIG. 8 depicts a signal timing diagram corresponding to the bit-grid determiner depicted in FIG. 7.

FIG. 8 depicts a signal timing diagram corresponding to the bit-grid determiner 706 depicted in FIG. 7. Specifically, the signal timing diagram depicted in FIG. 8 shows an example of the output signal (sync_filt_out) 750 of the SYNC-MF 104 and a scaled version 854 of the signal (sync_be) 754. As shown in FIG. 8, the scaled version 854 of the signal (sync_be) 754 indicates a change in the slope of the output signal (sync_filt_out) 750.

Turning back to the bit synchronizer 100 depicted in FIG. 1, the bit slicer 108 is configured to generate bits from the OOK modulated sequence received at the bit synchronizer based on the bit boundary determined by the bit-grid determiner 106 and an output from the matched filter 102. In some embodiments, the bit slicer compares the value of the output of the SYNC-MF 104 at a half-bit-grid with the value of the output of the SYNC-MF at bit-grid instant. In case that the value of the output of the SYNC-MF 104 at a half-bit-grid is less than or equal to the value of the output of the SYNC-MF at bit-grid instant, it is determined as logic '1', otherwise it is determined as logic '0'. The bit slicer can be implemented with one or more digital logic circuits.

FIG. 9 is a process flow diagram of a method for OOK communication in accordance with an embodiment of the invention. The flow diagram commences with "Start" (shown in the upper unlabeled ellipse. At block 902, an average symbol energy of an OOK modulated sequence is detected. At block 904, bit synchronization for the OOK modulated sequence is performed in response to the detected average symbol energy. The flow diagram ends with "End" (as shown in the lower unlabeled ellipse).

The various components or units of the embodiments that have been described or depicted may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments that have been described or depicted may be implemented in a processor, which may include a multi-function processor and/or an application-specific processor.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

The invention claimed is:

1. A method for On/Off Key (OOK) communication, the method comprising:
    detecting, by a matched filter, an average symbol energy of an OOK modulated sequence;
    performing, by a bit synchronization matched filter, bit synchronization for the OOK modulated sequence in response to the detected average symbol energy;
    correlating, by the bit synchronization matched filter, a known signal or template with an output from the matched filter and generating a corresponding output;
    determining, by a bit-grid determiner, a bit boundary for the OOK modulated sequence based on the output generated by the bit synchronization matched filter; and
    generating, by a bit slicer, bits from the OOK modulated sequence based on the bit boundary determined by the bit-grid determiner and the output of the matched filter.

2. The method of claim 1, wherein detecting the average symbol energy of the OOK modulated sequence comprises removing a parasitic direct current (DC) component of the OOK modulated sequence to generate an output sequence.

3. The method of claim 2, wherein removing the parasitic direct current (DC) component of the OOK modulated sequence comprises correlating a filter template with the OOK modulated sequence to detect a presence of the filter template in the OOK modulated sequence using a square wave subcarrier matched filter unit.

4. The method of claim 2, wherein detecting the average symbol energy of the OOK modulated sequence further comprises removing a sideband section from the output sequence or removing a signal section having an amplitude value that is below a threshold from the output sequence to generate a rectified output sequence.

5. The method of claim 4, wherein detecting the average symbol energy of the OOK modulated sequence further comprises correlating a filter template with the rectified output sequence to detect a presence of the filter template in the rectified output sequence using a moving average low pass filter unit.

6. A On/Off Key (OOK) communication device, the OOK communication device comprising:
 a matched filter configured to detect an average symbol energy of an OOK modulated sequence;
 a bit synchronization matched filter configured to perform bit synchronization for the OOK modulated sequence in response to the detected average symbol energy, wherein the bit synchronization matched filter is further configured to correlate a known signal or template with an output from the matched filter and to generate a corresponding output;
 a bit-grid determiner configured to determine a bit boundary for the OOK modulated sequence based on the output generated by the bit synchronization matched filter; and
 a bit slicer configured to generated bits from the OOK modulated sequence based on the bit boundary determined by the bit-grid determiner and the output of the matched filter.

7. The OOK communication device of claim 6, wherein the matched filter comprises a square wave subcarrier matched filter unit configured to remove a parasitic direct current (DC) component of the OOK modulated sequence to generate an output sequence.

8. The OOK communication device of claim 7, wherein the square wave subcarrier matched filter unit is configured to correlate a filter template with the OOK modulated sequence to detect a presence of the filter template in the OOK modulated sequence.

9. The OOK communication device of claim 7 wherein the matched filter further comprises a signal rectification unit configured to remove a sideband section from the output sequence or remove a signal section having an amplitude value that is below a threshold from the output sequence to generate a rectified output sequence.

10. The OOK communication device of claim 9, wherein the matched filter further comprises a moving average low pass filter unit configured to correlate a filter template with the rectified output sequence to detect a presence of the filter template in the rectified output sequence.

* * * * *